(12) United States Patent
Whitney et al.

(10) Patent No.: US 9,764,252 B2
(45) Date of Patent: Sep. 19, 2017

(54) SYSTEM AND METHOD TO TREAT A MULTIPHASE STREAM

(71) Applicants: Scott M. Whitney, Spring, TX (US); Edward J. Grave, Spring, TX (US); Tracy A. Fowler, Magnolia, TX (US)

(72) Inventors: Scott M. Whitney, Spring, TX (US); Edward J. Grave, Spring, TX (US); Tracy A. Fowler, Magnolia, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 408 days.

(21) Appl. No.: 14/380,589

(22) PCT Filed: Feb. 25, 2013

(86) PCT No.: PCT/US2013/027668
§ 371 (c)(1),
(2) Date: Aug. 22, 2014

(87) PCT Pub. No.: WO2013/148037
PCT Pub. Date: Oct. 3, 2013

(65) Prior Publication Data
US 2015/0014258 A1    Jan. 15, 2015

Related U.S. Application Data

(60) Provisional application No. 61/617,331, filed on Mar. 29, 2012.

(51) Int. Cl.
*B01D 17/02* (2006.01)
*B01D 17/04* (2006.01)
(Continued)

(52) U.S. Cl.
CPC ....... *B01D 17/0217* (2013.01); *B01D 17/045* (2013.01); *B01D 17/06* (2013.01);
(Continued)

(58) Field of Classification Search
CPC .. B01D 17/0217; B01D 17/06; B01D 17/045; B01D 21/267; B04C 3/04;
(Continued)

(56) References Cited

U.S. PATENT DOCUMENTS 2,967,618 A    1/1961   Zdenek
4,668,441 A    5/1987   Hess et al.
(Continued)

FOREIGN PATENT DOCUMENTS

WO    WO 2004/007908 A1    1/2004

OTHER PUBLICATIONS

The Written Opinion of the International Searching Authority for PCT/US2013/027668, dated Apr. 30, 2013.*
(Continued)

*Primary Examiner* — David A Reifsnyder
(74) *Attorney, Agent, or Firm* — ExxonMobil Upstream Research Company Law Department

(57) ABSTRACT

A system and method for enhancing separation of a denser phase liquid from a lighter phase liquid within a multiphase stream. In one example, a cyclonic coalescer has a tubular housing and a plurality of coaxial flow chambers extending in the axial direction of the housing. A swirling element is associated with each of the plurality of coaxial flow chambers. The swirling elements are constructed and arranged to impart a tangential velocity of the stream flowing through the associated flow chamber.

26 Claims, 4 Drawing Sheets

(51) Int. Cl.

| | |
|---|---|
| *B01D 17/06* | (2006.01) |
| *B01D 21/26* | (2006.01) |
| *B04C 3/00* | (2006.01) |
| *B04C 3/04* | (2006.01) |
| *B03C 11/00* | (2006.01) |
| *C10G 31/10* | (2006.01) |
| *E21B 43/34* | (2006.01) |

(52) U.S. Cl.
CPC .............. *B03C 11/00* (2013.01); *B04C 3/04* (2013.01); *C10G 31/10* (2013.01); *E21B 43/34* (2013.01); *B01D 21/267* (2013.01); *B04C 2003/003* (2013.01); *B04C 2003/006* (2013.01)

(58) Field of Classification Search
CPC ........ B04C 2003/003; B04C 2003/006; B03C 11/00; C10G 31/10; E21B 43/34
See application file for complete search history.

(56) References Cited

U.S. PATENT DOCUMENTS

| | | |
|---|---|---|
| 5,032,273 A | 7/1991 | Senyard, Sr. |
| 6,197,095 B1 | 3/2001 | Ditria et al. |
| 6,730,236 B2 | 5/2004 | Kouba |
| 6,872,239 B2 | 3/2005 | Nilsen et al. |
| 7,152,682 B2 | 12/2006 | Hopper |
| 7,210,530 B2 | 5/2007 | Lush et al |
| 7,351,320 B2 | 4/2008 | Sams |
| 7,490,671 B2 | 2/2009 | Gramme et al. |
| 7,516,794 B2 | 4/2009 | Gramme et al. |
| 7,520,989 B2 | 4/2009 | Ostergaard |
| 8,333,825 B2 | 12/2012 | Sarshar et al. |
| 2006/0065609 A1 | 3/2006 | Arthur |
| 2008/0035586 A1 | 2/2008 | Chen et al. |
| 2008/0257739 A1 | 10/2008 | Sams et al. |
| 2009/0200213 A1 | 8/2009 | Varadaraj et al. |
| 2009/0294996 A1 | 12/2009 | Matsumato |
| 2010/0006516 A1 | 1/2010 | Schook |
| 2011/0139625 A1 | 6/2011 | Arntzen et al. |
| 2011/0253539 A1 | 10/2011 | Akdim et al. |

OTHER PUBLICATIONS

Arnold, K. E. et al, "Designing Tomorrow's Compact Separation Train", SPE 56644, Oct. 1999, pp. 1-16.

Sinker, A. et al, "Applying the Compact Separation Methodology to Heavy Oil Separation", Heavy Oil Field Development, Sep. 29-30, 1997, pp. 1-17, Abderdeen, UK.

* cited by examiner

SYSTEM AND METHOD TO TREAT A MULTIPHASE STREAM

CROSS-REFERENCE TO RELATED APPLICATION

This application is the National Stage of International Application No. PCT/US2013/027668, filed 25 Feb. 2013, which claims the priority benefit of U.S. Provisional Patent Application 61/617,331, filed 29 Mar. 2012 entitled SYSTEM AND METHOD TO TREAT A MULTIPHASE STREAM, the entirety of which is incorporated by reference herein.

FIELD OF INVENTION

This invention generally relates to the field of fluid separation and, more particularly, to the treatment of a multiphase fluid stream in connection with hydrocarbon production activities.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

The energy industry has become increasingly interested in capturing deep-water hydrocarbon production opportunities. An approach to potentially enhance the amount of oil recovered from these opportunities is the use of subsea separation systems to treat the streams of hydrocarbons, water, gas, and other materials produced from subsea wells. Subsea separation offers substantial benefits for oil and gas production including (1) reduced flow assurance concerns, (2) reduced pipeline or line sizing, (3) reduced topside facilities, and (4) reduced energy loss resulting from multiphase flow in the lines. Many of these benefits are presently being realized by the oil and gas industry as subsea processing skids are being developed and applied in an increasing number of fields.

While subsea separation is not trivial is shallow waters (<1500 m), it becomes more challenging in deeper water. As water depth increases, the external pressure on a vessel created by the hydrostatic head increases the required wall thickness for the vessels. At depths greater than 1500 m, the vessel wall thickness necessary to withstand the water pressure becomes impractical as the allowable vessel size is limited in diameter by wall thickness and weight. As a result, deep-water subsea separation is a challenge since traditional large diameter separators cannot typically be used.

As understood by those skilled in the art, fluid streams produced from oil and gas wells generally comprise multiphase mixtures of oil, water, gases, sands, and other materials. Typically, the separation of the oil from water requires a large vessel (i.e., gravity separator) that will provide long retention times sufficient to allow the oil and water to separate. However, due to the size and weight constraints noted above, this is not practical for many offshore and subsea applications.

Therefore, it would be beneficial from an economic standpoint for oil production facilities and the associated separation equipment to be reduced in size in terms of weight and footprint. However, the availability of compact oil/water separation devices is limited. In addition to gravity separators, two other types of deep-water separation devices are usually used: electrostatic coalescers and cyclonic separators. As appreciated by those of ordinary skill, coalescence increases the average droplet size of a fluid distributed in a continuous phase. Per Stokes Law, increased droplet size increases the settling speed which in turn allows for faster separation of the liquids in the downstream gravity separator.

There are versions of electrostatic coalescers which are intended to be situated upstream of the gravity separator to enhance coalescence. An electrostatic coalescer generates an electrical field to induce droplet coalescence in water-in-crude-oil multiphase streams. The electric field acts upon water in the stream causing the water droplets to align. Due to their polarized nature, the droplets are attracted and ultimately collide resulting in coalescence. Some compact electrostatic coalescers are designed solely to coalesce and rely on downstream separators to separate the liquid phases.

Like electrostatic coalescers, cyclonic coalescers may also be situated upstream of the gravity separator to enhance coalescence and thus separation. Unlike electrostatic coalescers, cyclonic coalescers mechanically manipulate the flow path of the fluid stream to induce separation. In operation, cyclonic separators swirl the multiphase stream to induce a centrifugal acceleration onto the denser phase droplets. As the denser fluid is pushed to the wall of the cyclonic separators, the droplets of the denser fluid coalesce. Depending on the density difference between the two phases to be separated, conventional cyclonic coalescer designs often require a high value of centrifugal acceleration for the desired coalescence. However, the high centrifugal acceleration causes the dense phase and/or light phase droplets to begin to shatter due to turbulent effects of the stream. For this reason, application of cyclonic coalescers at practical scales outside of the lab environment has been challenged.

The incentives for deep-water subsea separation are well known, as are the challenges. Known techniques fail to meet these challenges. Existing techniques may enable separation of oil/water streams where emulsions are not likely, or where the watercut is low or high, and thus outside of the inversion range of the mixture. However many fields produce oil/water mixtures with emulsion tendencies which stabilize to a higher degree at watercuts near the inversion range. Due to the limited separation time in deepwater subsea separation and existing limitations of compact equipment, it is challenging to achieve separation of oil/water throughout the entire production life of the aforementioned fields without significantly reducing production rates during the inversion range, or accepting a lower quality oil/water separation from the subsea separation system as is normally achieved outside of the inversion range. Thus, there is a need for improvement in this field.

SUMMARY OF THE INVENTION

The present invention provides a system and method for treating a multiphase stream.

One embodiment of the present disclosure is a cyclonic coalescer for enhancing separation of a denser phase liquid from a lighter phase liquid within a multiphase stream, the coalescer comprising: a tubular housing; a plurality of coaxial flow chambers extending in the axial direction of the housing; and a swirling element associated with each of the plurality of coaxial flow chambers, the swirling elements are constructed and arranged to impart a tangential velocity of the stream flowing through the associated flow chamber.

The foregoing has broadly outlined the features of one embodiment of the present disclosure in order that the detailed description that follows may be better understood. Additional features and embodiments will also be described herein.

BRIEF DESCRIPTION OF THE DRAWINGS

The present invention and its advantages will be better understood by referring to the following detailed description and the attached drawings.

Figure 1:
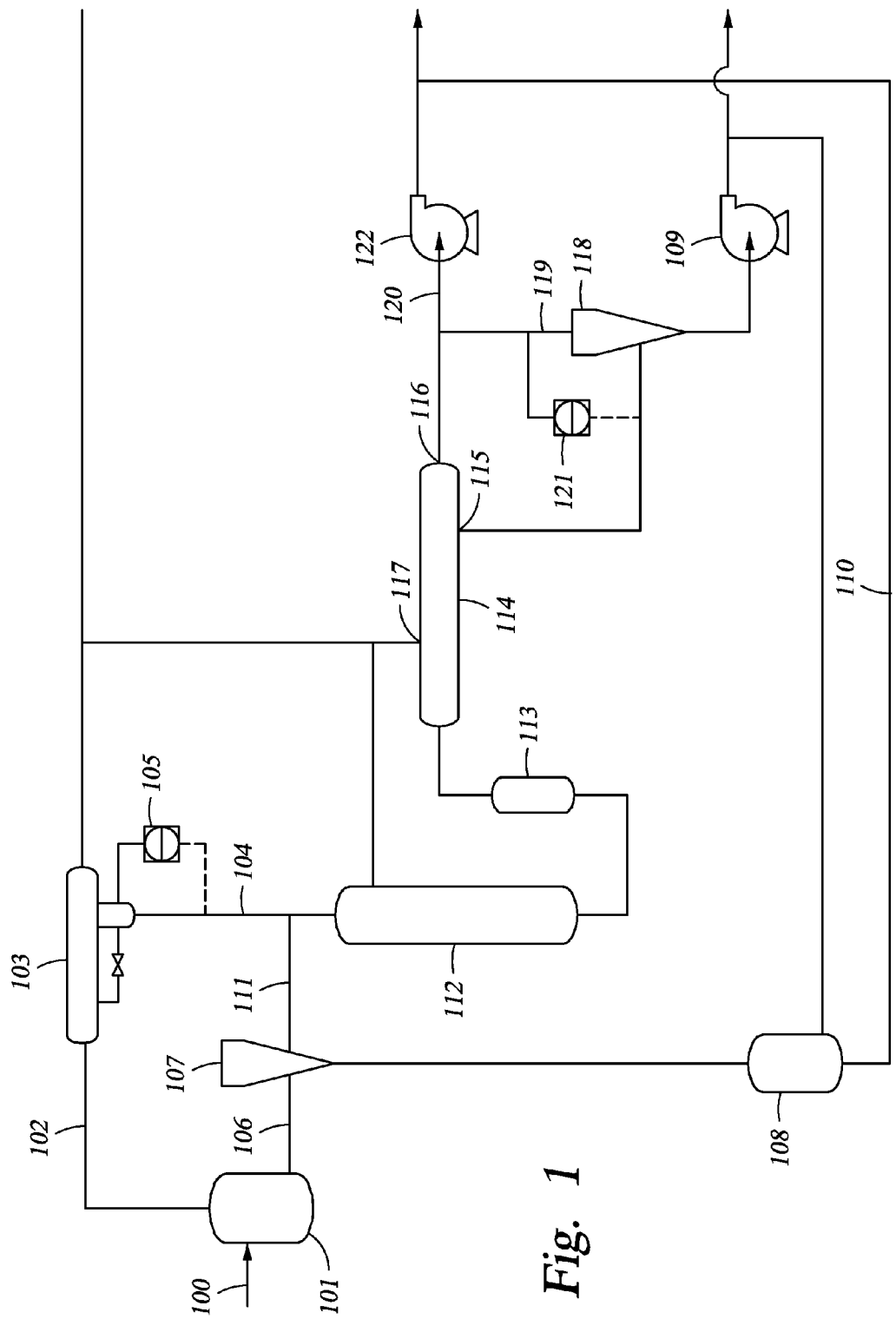
FIG. 1 is a schematic drawing of a separation system according to one embodiment of the present disclosure.

It should be noted that the figures are merely examples of several embodiments of the present invention and no limitations on the scope of the present invention are intended thereby. Further, the figures are generally not drawn to scale, but are drafted for purposes of convenience and clarity in illustrating various aspects of certain embodiments of the invention.

DESCRIPTION OF THE SELECTED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 is a schematic of a separation system according to one embodiment of the present disclosure. A majority of the components depicted in FIG. 1 are known and common within such systems. The following description provides the appropriate context. As will be appreciated by those of ordinary skill in the art, the majority of the system components may be designed based on pipe code such that the requisite wall thicknesses and system size are reduced but still suitable for deep-water operations.

As depicted in FIG. 1, a multiphase stream of gas/sand/oil/water 100 is provided which is separated into gas and sand/oil/water streams by an inlet gas/liquid separator 101. In one embodiment, the inlet separator 101 includes a fluid momentum-reducing device that acts to slow down the velocity of the inlet stream 100 such that separation can occur. The inlet separator 101 may utilize multiple parallel pipes for bulk separation of the gas phase from the liquid phase of the liquid dominated by volume multiphase stream 100. In some embodiments, inlet separator 101 may be a cyclonic or a traditional gravity separation system. The inlet separator 101 may incorporate a volume for slug dampening which will increase the separation efficiency of the downstream components.

In some applications, the separated gas stream from the inlet separator 101 may require polishing to remove any excess liquid that was carried with the gas. In the system depicted in FIG. 1, the gas phase from separator 101 flows through a conduit 102 to be further processed by a cyclonic gas polishing device 103. In one embodiment, the cyclonic gas polishing device 103 separates liquid from the gas stream by generating a rotation in the fluid that sends the dense phase toward the outer wall. The liquid extracted by gas polishing device 103 is recombined with the liquid stream from the bulk separator 101 (but after the desanding process described below) through a conduit 104. This process may be assisted by use of an eductor or pump 105.

The separated liquid stream from the inlet separator 101 flows through a conduit 106 to a cyclonic desanding device 107 that removes the majority of the sand content in the stream and transfers it to a sand accumulator 108. In some embodiments, desanding device 107 is a cyclonic desander consisting of a single large cyclone. In other embodiments, multiple small cyclones are utilized. In applications where cyclones are not preferred, a gravity desander may be utilized.

Sand accumulator 108 is a sand collection system that may be included in the same vessel as desander 107 or may be in a separate vessel as depicted in FIG. 1. In one embodiment, the sand accumulator 108 has a mechanism to fluidize the collected sand, such as a water purge stream, so that the sand can then be removed from the accumulator 108. As appreciated by those skilled in the art, the sand accumulator 108 may be flushed at timed intervals or at specific sand level set points as determined by a level profiler in the accumulator or sand detector upstream of the device. In the depicted system, the accumulator 108 is flushed with a water stream from the water injection pump 109 via 110.

The desanded liquid flows from desander 107 through conduit 110 and the degassed liquid flows from gas polishing cyclone 103 through conduit 104 to an electrostatic coalescer 112. As will be appreciated by those skilled in the art, electrostatic coalescer 112 uses electrostatic forces to enhance coalescence of water droplets within the fluid stream. The resulting stream flows out of the electrostatic coalescer 112 into a cyclonic coalescer 113 where it is swirled to impart a tangential velocity component onto the multiphase stream in order to enhance coalescence of at least the denser phase liquid. One embodiment of cyclonic coalescer 113 will be discussed in greater detail herein below. In the depicted embodiment, cyclonic coalescer 113 is positioned downstream of electrostatic coalescer 112 in a separate housing. In another embodiment, cyclonic coalescer 113 and electrostatic coalescer 112 are housed together in a single body.

The outlet stream from cyclonic coalescer 113 flows to an oil/water gravity separator 114. In one embodiment, gravity separator 114 comprises horizontal piping defining a water outlet 115, oil outlet 116, and a gas vent 117. If the water stream from gravity separator 114 requires further processing, a system of one or more water polishing cyclones 118 may be used to remove the oil from the water. The removed oil is then recombined through conduit 119 with the outlet oil stream from the oil/water gravity separator 114 in conduit 120 by use of a pump 121. The water from the cyclones 118 proceeds to the water injection pump 109 for reinjection. The oil stream flows to an oil pump 122 to be transferred for further treatment, storage, sale, etc.

When the cyclonic coalescer 113 is provided upstream of the gravity separation vessel 114, the oil/water separation efficiency of the gravity separator 114 is enhanced. In one embodiment, gravity separation vessel 114 is a vessel large enough to provide sufficient residence time for the oil and water to separate by means of gravity. In other embodiments, a cyclonic oil/water separation device is substituted for the gravity separator 114.

In separating the components of a produced multiphase stream, it is desirable to cause the droplets of a denser phase (such as, but not limited to, water) to coalesce such that the average or median droplet size of the denser phase increases, thereby increasing the settling rate according to Stokes Law. In some embodiments, the process also increases the average or median droplet size of a lighter phase (such as, but not limited to, oil). One of the main challenges in coalescing denser phase droplet is obtaining a desired degree of separation without entering into a secondary droplet breakup. The centrifugal acceleration applied to a multiphase stream in a cyclonic coalescer is a factor in determining the coalescence of denser phase droplets. Other factors being equal, a higher centrifugal acceleration results in a greater coalescence. Based on the required downstream separation, it is possible to determine a desired average droplet size after coalescence along with a corresponding centrifugal acceleration in the cyclonic coalesce to achieve that droplet size.

To achieve a particular centrifugal acceleration one can alter the tangential velocity of the stream or the radius around which that stream is swirling. If one chooses to increase the tangential velocity to increase the acceleration, then eventually this increased tangential velocity creates droplet shearing within the stream and that shearing impedes coalescence by causing droplet breakup. Accordingly, while it is preferable to increase centrifugal acceleration, tangential velocity of the fluid stream should be controlled to avoid shearing.

Figure 2:
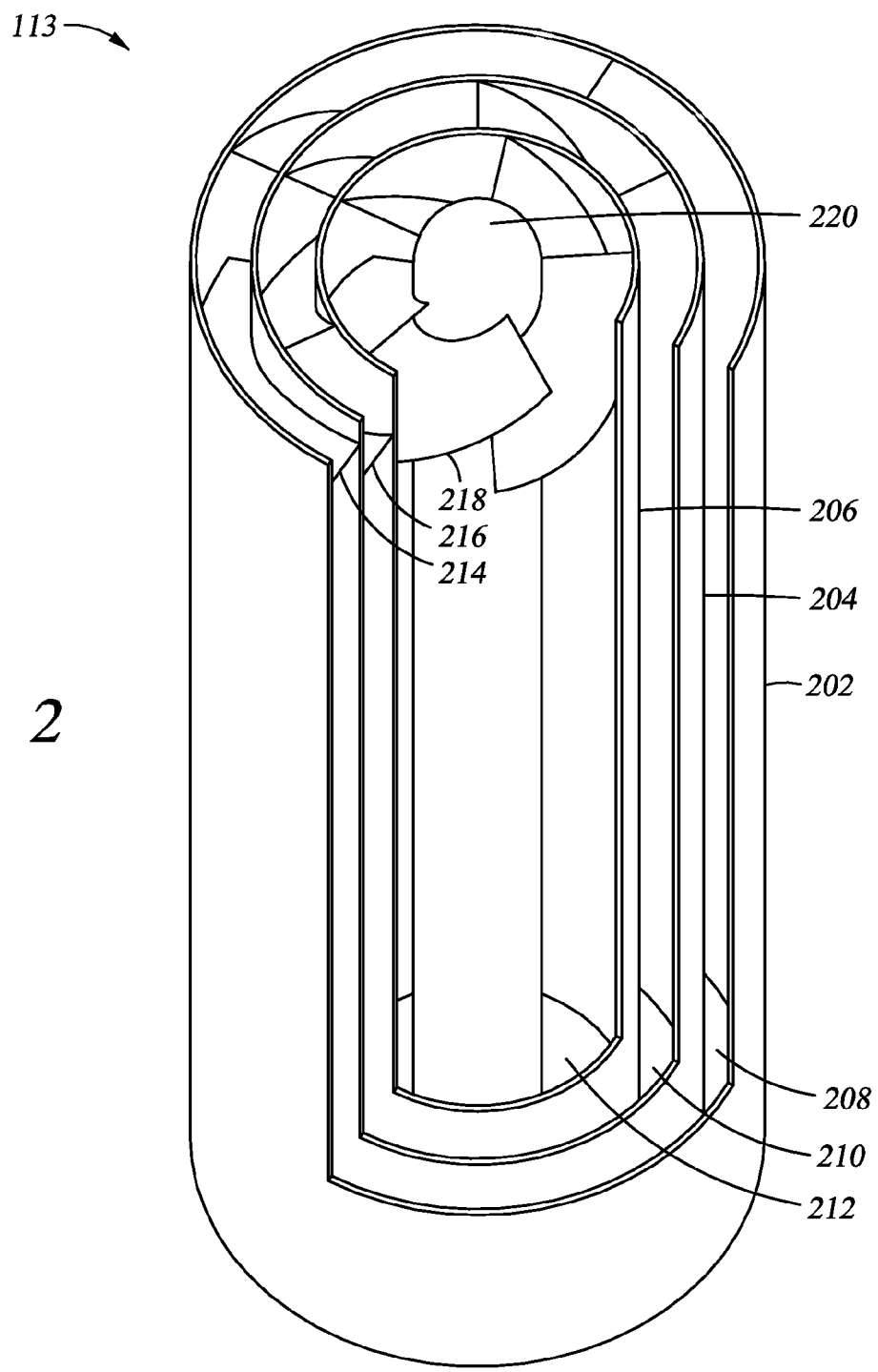
FIG. 2 is a perspective view in partial cross-section of a cyclonic coalescer according to one embodiment of the present disclosure.
Figure 3:
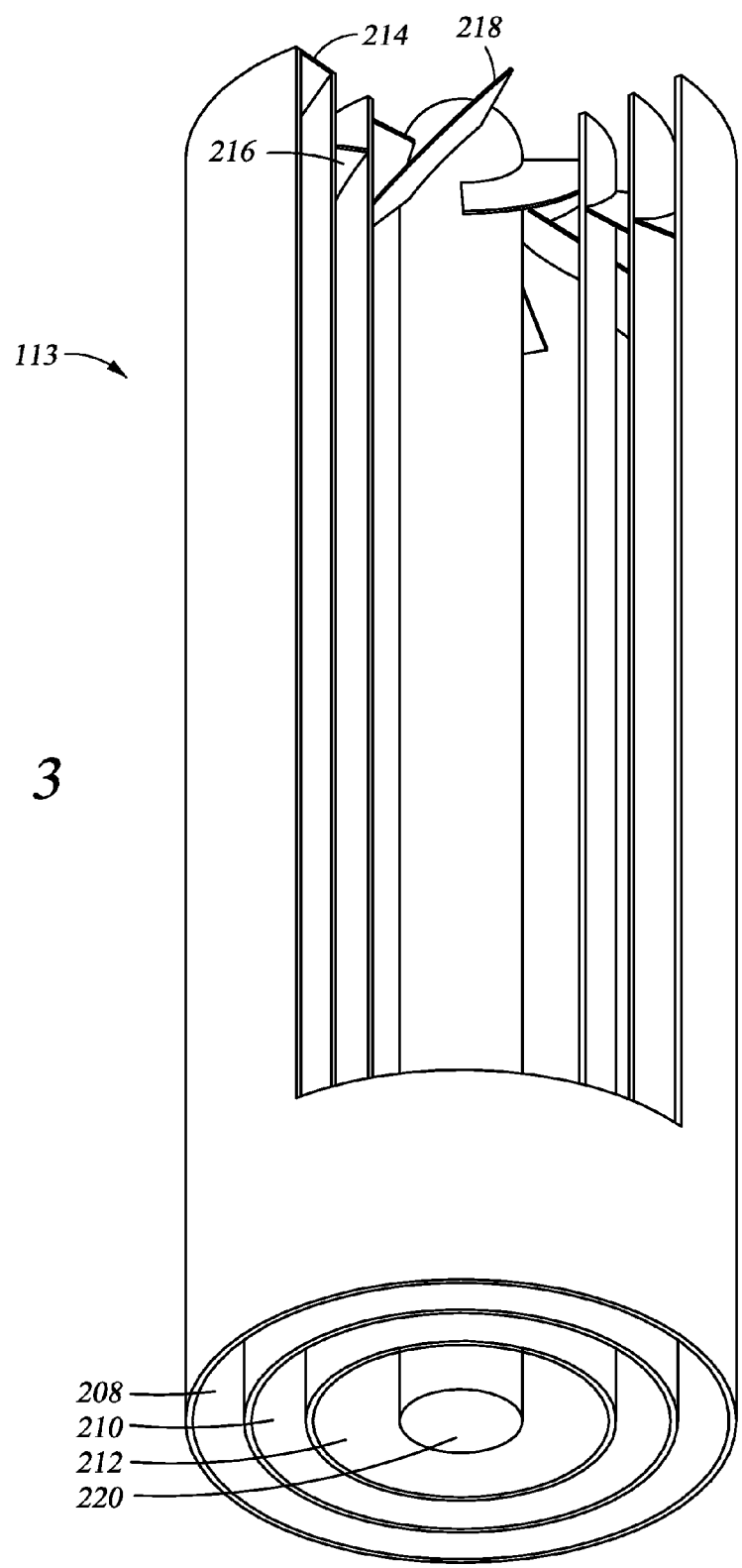
FIG. 3 is a further perspective view in partial cross-section of the cyclonic coalescer depicted in FIG. 2.

FIGS. 2 and 3 provide partial cross-sections of cyclonic coalescer 113 according to one embodiment of the present disclosure. As depicted, cyclonic coalescer 113 comprises a tubular housing 202. In one embodiment, housing 202 is constructed and arranged to be affixed inside a pipe or vessel. In other embodiments, housing 202 is constructed and arranged to affix to a pipe end.

Within housing 202 is a plurality of flow separators 204, 206 which define a plurality of coaxially aligned flow chambers 208, 210, 212. In other embodiments, more or less flow separators may be utilized in order to define two or more coaxially aligned flow chambers. Each flow chamber 208, 210, 212 has an associated swirling element 214, 216, 218. In the depicted embodiment, central swirling element 214 is held in place by a support member 220. In other embodiments, support member 220 is unnecessary as swirling element 214 is held in place by being affixed to the interior of flow chamber 206.

As depicted, swirling elements 214, 216, 218 are vanes. In one embodiment, each vane is fixed at an angle between 40° and 50° with respect to the axial direction of the associated flow chamber. In some embodiments, angular orientation of vanes 214, 216, 218 may be varied to adjust the tangential velocity imparted onto the fluid stream in the various flow chambers. Though vanes are depicted, other mechanisms and means to swirl the incoming flow stream are contemplated, such as, but not limited to, notches on or grooves within the flow separators. In embodiment depicted in FIGS. 2 and 3, the swirling elements 214, 216, 218 extend only partially within housing 202. In other embodiments, the swirling elements extend the entire axial dimension of housing 202.

Regardless of particular design, swirling elements 214, 216, 218 are constructed and arranged to impart a tangential velocity of the stream flowing through the associated flow chamber 208, 210, 212. The imparted rotation causes the denser phase of the fluid stream to move toward the outer wall defining the flow chamber, i.e., housing 202 or flow separators 204, 206 in the depicted embodiment. This motion increases the number of denser phase droplet interactions, thus further coalescing the droplets in the stream.

In one embodiment of the present disclosure, the cyclonic coalescer comprises a longitudinally extending tubular housing with an inlet for receiving well stream fluids and an outlet. Depending on application specifications, the inlet of the cyclonic coalescer is sized to match to the outlet of an upstream device, such as, but not limited to, an electrostatic coalescer, or the conduit connecting the upstream device to the cyclonic coalescer. As appreciated by those skilled in the art, the matching is to avoid shearing or other undue effects on the stream flow that would impede coalescence. With the size of the cyclonic coalescer housing established and based on the physical properties of the stream to be separated, a desired denser phase cut diameter may be selected. In one embodiment, housing 202 has an outer diameter of 16" such that it could fit within an 18" pipe. In one embodiment, housing 202 has an overall length of approximately 6 feet.

Though not depicted in FIGS. 2 and 3, some embodiments of the cyclonic coalescer include an anti-swirl element to reduce the tangential velocity component of the output of the cyclonic coalescer. In one embodiment, the anti-swirl element is a flow straightener utilizing baffles. In other embodiments, the anti-swirl element is housed externally from the cyclonic coalescer and upstream of the gravity separator.

Figure 4:
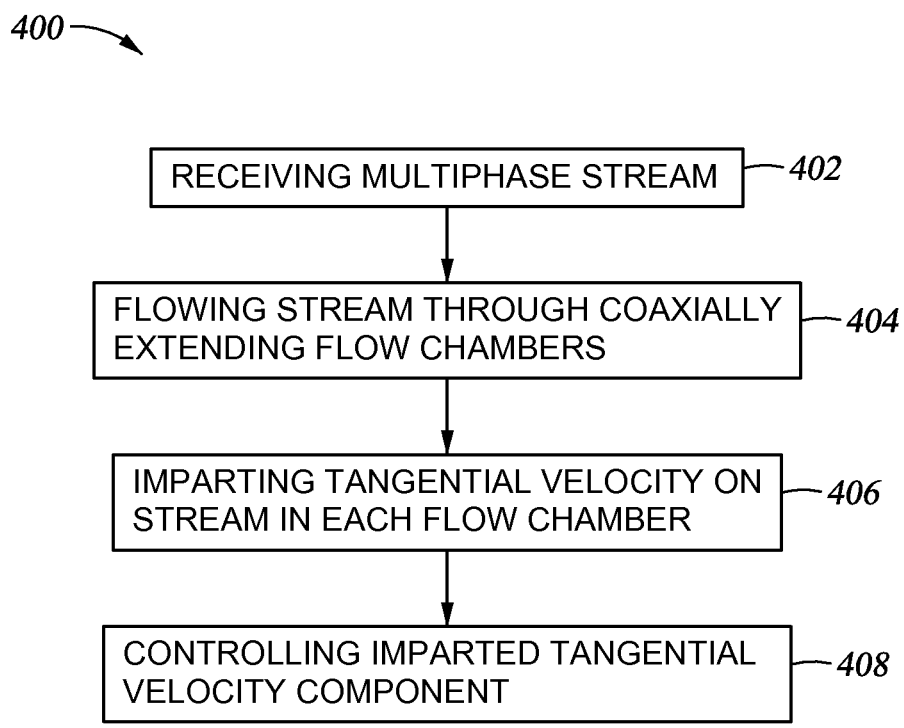
FIG. 4 is a flow chart showing the basic steps of treating a fluid stream according to one embodiment of the present disclosure.

The flowchart of FIG. 4 will be referred to in describing one embodiment of the present disclosure for treating a multiphase fluid stream to enhance separation of a denser phase liquid from a lighter phase liquid within the multiphase fluid stream. The depicted process (400) starts by receiving the multiphase fluid stream (step 402). The process continues by flowing the stream into a plurality of coaxially extending flow chambers (step 404). A tangential velocity component is then imparted on the stream flowing through each flow chamber (step 406). In one embodiment, the tangential velocity is imparted using a swirl element. In some embodiments, the swirl element is a vane.

In the process depicted in FIG. 4, the imparted tangential velocity component is controlled in order to increase the average denser phase droplet size (step 408). In one embodiment, the tangential velocity is controlled by limiting the total velocity of the flow stream flowing into the flow chambers. As stated above, it is desirable to increase centrifugal acceleration; however, as stream velocity increases, sand erosion becomes a problem and high tangential velocity will cause droplet breakup as the result of shearing. Therefore, the tangential and/or total velocity of the flow stream may be limited. In some embodiments, the tangential velocity imparted on the fluid stream is controlled to be less than 2 m/s in order to avoid shearing and droplet breakup. In some embodiments, the total velocity of the fluid stream through the flow chambers is limited to be less than 3 m/s. In embodiments where a vane is utilized, the tangential velocity is controlled by selecting a vane angle with respect to the axial direction of the flow chambers. A variety of vane angles may be implemented, such as, but not limited to, between 40° and 50°.

Through application of the at least one embodiment described herein, the denser phase liquid has a cut diameter of 1000-1350 microns after the tangential velocity has been imparted on the stream. In some embodiments, the tangential velocity imparted on the stream causes an average lighter phase droplet size to increase.

Though not depicted in FIG. 4, some embodiments of the present disclosure include the additional step of straightening the flow downstream of the swirl element to reduce the tangential velocity component of the stream. The steps depicted in FIG. 4 are provided for illustrative purposes only and a particular step may not be required to perform the inventive methodology.

In some embodiments, the inlet of the cyclonic coalescer communicates directly with and receives the output stream from an electrostatic coalescer with no or minimal devices, such as valves, between the electrostatic coalescer and the cyclonic coalescer that could cause shearing. The electrostatic coalescer may be traditional, compact, or inline, i.e., pipe size diameter. In certain embodiments, placement of the cyclonic coalescer of and directly following the electrostatic coalescer permits for oil/water separation of heavy oils that may be highly viscous or emulsified. As appreciated by those skilled in the art, heavy oil emulsions tend to be very stable and resistant to coalescence and therefore are difficult to separate. In addition, heavy oil mixtures are highly susceptible to processes, such as shear, that break up droplets. These characteristic of heavy oil emulsions add to the difficulties in separating streams containing such heavy oils. Compact separation systems that depend solely on pipe separation or other gravity separation may not be able to accomplish oil/water separation of produced streams from fields that have oils tending to emulsify or that are difficult to separate due to high viscosity.

Various embodiments of the separation system of the present disclosure are contemplated. For example, multiple inline cyclonic coalescers may be utilized, either downstream of an electrostatic coalescer as described above, or upstream of a gravity separator, or both. The cyclonic coalescer or coalescers of the present disclosure may be installed horizontally, vertically, or angled to ensure proper drainage of bulk water. In some embodiments, the electrostatic coalescer, cyclonic coalescer, and gravity separator may be consolidated into one device. The oil/water gravity separator may be comprised of a long pipe section, a curved pipe section or a system of multiple sections of horizontal pipe. A bypass system may be included to allow water to bypass the deoiling cyclones if further water treatment after the gravity separator is not necessary.

One embodiment of the present disclosure provides a method of producing hydrocarbons from a subsurface reservoir. In such an embodiment, hydrocarbons are produced through a wellbore. The produced hydrocarbons exist in a liquid-dominated-by-volume multiphase stream having a denser phase liquid and a lighter phase liquid. The stream is then flowed into a plurality of longitudinally extending flow chambers. A tangential velocity component is then imparted on the stream flowing through each flow chamber. In one embodiment, the tangential velocity is imparted using a swirl element. The tangential velocity component imparted on the stream is controlled to increase an average denser phase droplet size.

In one embodiment, the gas and oil streams may be recombined after bulk separation. In this embodiment, a gas polishing cyclone may not be required. A multiphase pump may then be used to pump the multiphase fluid. The process may incorporate slug management controls for optimization.

In some applications, multiple trains of the disclosed separation system may be applied for the same field.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

What is claimed is:

1. A cyclonic coalescer for enhancing separation of a denser phase liquid from a lighter phase liquid within a multiphase stream, the coalescer comprising:
    an inlet for receiving the stream;
    a tubular housing having a first length;
    a plurality of coaxial flow chambers extending in the axial direction of the housing;
    a swirling element associated with each of the plurality of coaxial flow chambers, the swirling elements extend a second length and are constructed and arranged to impart a tangential velocity of the stream flowing through the associated flow chamber; and
    an outlet providing the stream including the denser phase liquid and the lighter phase liquid of the stream, wherein an average droplet size or a median droplet size of the denser phase liquid of the stream is increased.

2. The coalescer of claim 1, wherein the first length is greater than the second length.

3. The coalescer of claim 1, wherein the first length is equal to the second length.

4. The coalescer of claim 1, wherein the swirling element is a vane.

5. The coalescer of claim 4, wherein the vane is fixed at an angle between 40° and 50° with respect to the axial direction of the associated flow chamber.

6. The coalescer of claim 1 further comprising an anti-swirl element associated with each of the plurality of coaxial flow chambers.

7. The coalescer of claim 6, wherein the anti-swirl elements are positioned downstream of the swirling elements.

8. The coalescer of claim 1, wherein the housing has an internal diameter of 16 inches.

9. A system for treating a multiphase fluid stream comprising a denser phase liquid and a lighter phase liquid, the system comprising:
    an electrostatic coalescer; and
    a cyclonic coalescer comprising:
        an inlet to receive the stream from the electrostatic coalescer,
        a tubular housing having a first length and in fluid communication with the electrostatic coalescer,
        a plurality of coaxial flow chambers extending in the axial direction of the housing,
        a swirling element associated with each of the plurality of coaxial flow chambers, the swirling elements extend a second length and are constructed and arranged to impart a tangential velocity of the stream flowing through the associated flow chamber, and an outlet providing the stream including the denser phase liquid and the lighter phase liquid of the stream, wherein an average droplet size or a median droplet size of the denser phase liquid of the stream is increased compared to the stream received into the inlet.

10. The system of claim 9, wherein the first length is greater than the second length.

11. The system of claim 9, wherein the swirling element is a vane.

12. The system of claim 11, wherein the vane is fixed at an angle between 40° and 50° with respect to the axial direction of the associated flow chamber.

13. The system of claim 9 further comprising an anti-swirl element associated with each of the plurality of coaxial flow chambers.

14. The system of claim 13, wherein the anti-swirl elements are positioned downstream of the swirling elements.

15. The system of claim 9, wherein the cyclonic coalescer is downstream of the electrostatic coalescer.

16. The system of claim 9 further comprising a gravity separation vessel in fluid communication with the cyclonic coalescer.

17. The system of claim 16, wherein the gravity separation vessel is downstream of the cyclonic coalescer.

18. A method for treating a multiphase fluid stream to enhance separation of a denser phase liquid from a lighter phase liquid within the multiphase fluid stream, the method comprising:
flowing the stream into a plurality of coaxially extending flow chambers;
imparting a tangential velocity component on the stream flowing through each flow chamber, the tangential velocity is imparted using a swirl element;
controlling the tangential velocity imparted on the stream to increase an average denser phase liquid droplet size of the stream; and
flowing the stream to an outlet.

19. The method of claim 18, wherein controlling the tangential velocity comprises limiting the total velocity of the flow stream flowing into the flow chambers.

20. The method of claim 19, wherein the total velocity of the flow stream flowing into the flow chambers is less than 3 m/s.

21. The method of claim 18, wherein the swirl element is a vane, wherein controlling the tangential velocity comprises selecting a vane angle with respect to the axial direction of the flow chambers.

22. The method of claim 21, wherein the vane angle is between 40° and 50°.

23. The method of claim 18, wherein the denser phase liquid has a cut diameter of 1000-1350 microns after the tangential velocity has been imparted on the stream.

24. The method of claim 18 further comprising straightening the flow downstream of the swirl element to reduce the tangential velocity component of the stream.

25. The method of claim 18, wherein the tangential velocity imparted on the stream causes an average lighter phase droplet size to increase.

26. A method of producing hydrocarbons from a subsurface reservoir, comprising:
producing hydrocarbons through a wellbore, the produced hydrocarbons exist in a liquid-dominated-by-volume multiphase stream having a denser phase liquid and a lighter phase liquid;
flowing the hydrocarbon stream into a plurality of longitudinally extending coaxial flow chambers;
imparting a tangential velocity component on the hydrocarbon stream flowing through each flow chamber, the tangential velocity is imparted using a swirl element;
controlling the tangential velocity imparted on the hydrocarbon stream to increase an average denser phase liquid droplet size of the hydrocarbon stream; and
flowing the hydrocarbon stream to an outlet.

* * * * *